United States Patent

[11] 3,543,650

| [72] | Inventor | Thomas H. Boyce, Jr. |
| | | Houston, Texas |
| [21] | Appl. No. | 790,413 |
| [22] | Filed | Jan. 10, 1969 |
| [45] | Patented | Dec. 1, 1970 |
| [73] | Assignee | Stewart & Stevenson Services, Inc. |
| | | Houston, Texas |
| | | a corporation of Texas |

[54] ROTARY TABLE POWER UNIT
2 Claims, 3 Drawing Figs.

[52] U.S. Cl. ..................................................... 173/43,
74/661, 74/722
[51] Int. Cl. ...................................................... E21c 11/00,
F16h 37/14
[50] Field of Search ........................................... 74/661,
722; 173/43

[56] References Cited
UNITED STATES PATENTS

| 3,301,334 | 1/1967 | Odgers et al. ............... | 173/43 |
| 3,477,522 | 11/1969 | Templeton .................. | 173/43 |
| 845,850 | 3/1907 | Carter ......................... | 74/661X |
| 1,610,673 | 12/1926 | Grattan ....................... | 74/661 |
| 2,910,889 | 11/1959 | Lackey ........................ | 74/661 |
| 3,157,236 | 11/1964 | Arthur ......................... | 74/722X |
| 3,340,748 | 9/1967 | Young .......................... | 74/661 |

*Primary Examiner*—Arthur T. McKeon
*Attorneys*—James F. Weiler, Jefferson D. Giller, William A. Stout, Paul L. De Verter, II, Dudley R. Dobie, Jr. and Henry W. Hope ABSTRACT: A rotary table having first and second power input shafts connected to first and second prime movers with first and second power shafts positioned parallel to the axis of the rotary table and being perpendicular to their respective power input shafts with a speed reduction gear drive between each of the power shafts and one of the input shafts and a speed reduction chain drive between each of the power shafts and the rotary table output. A rotary table power unit for attachment to a crane having an elongate boom having a support for connection to and positioned beneath the boom for supporting a pair of prime movers positioned side by side to provide a dual input to the rotary table.

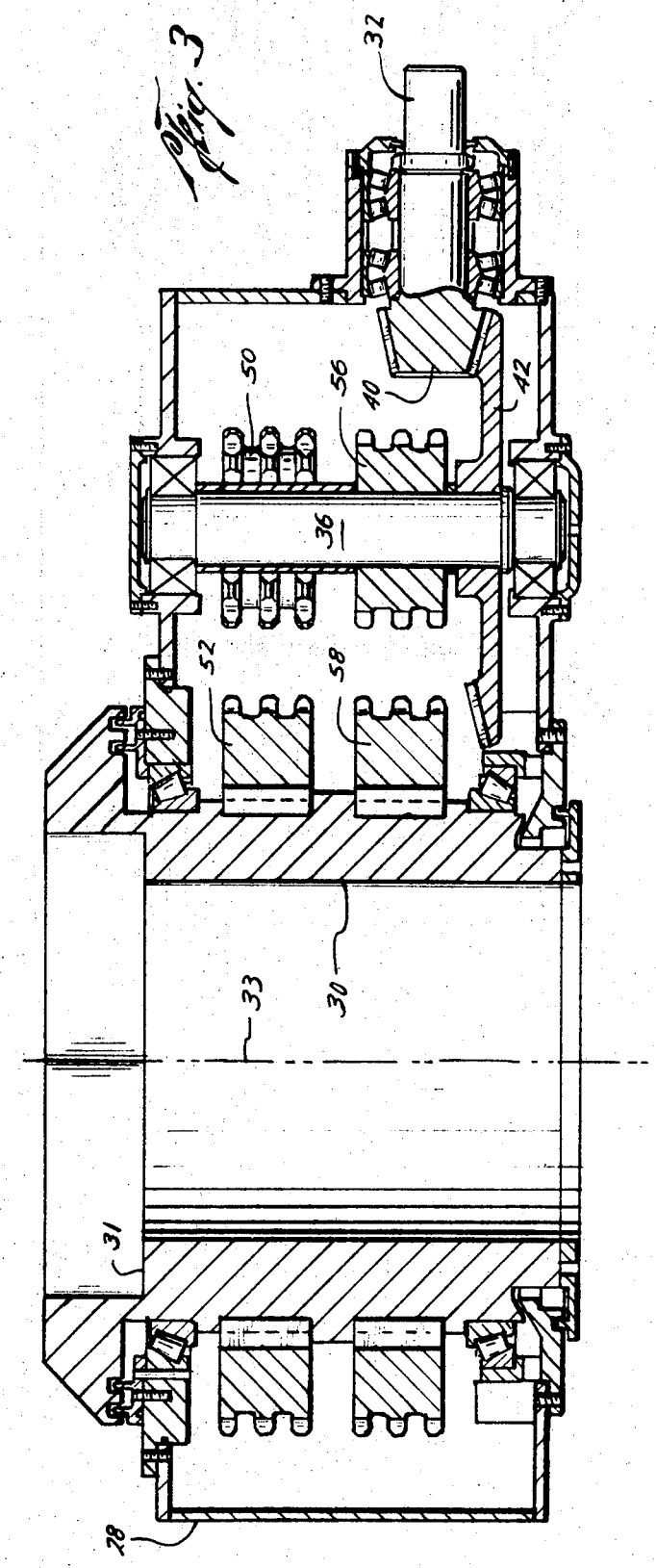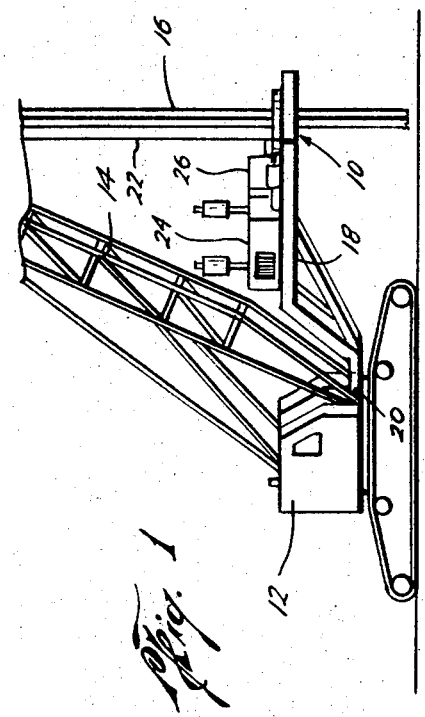

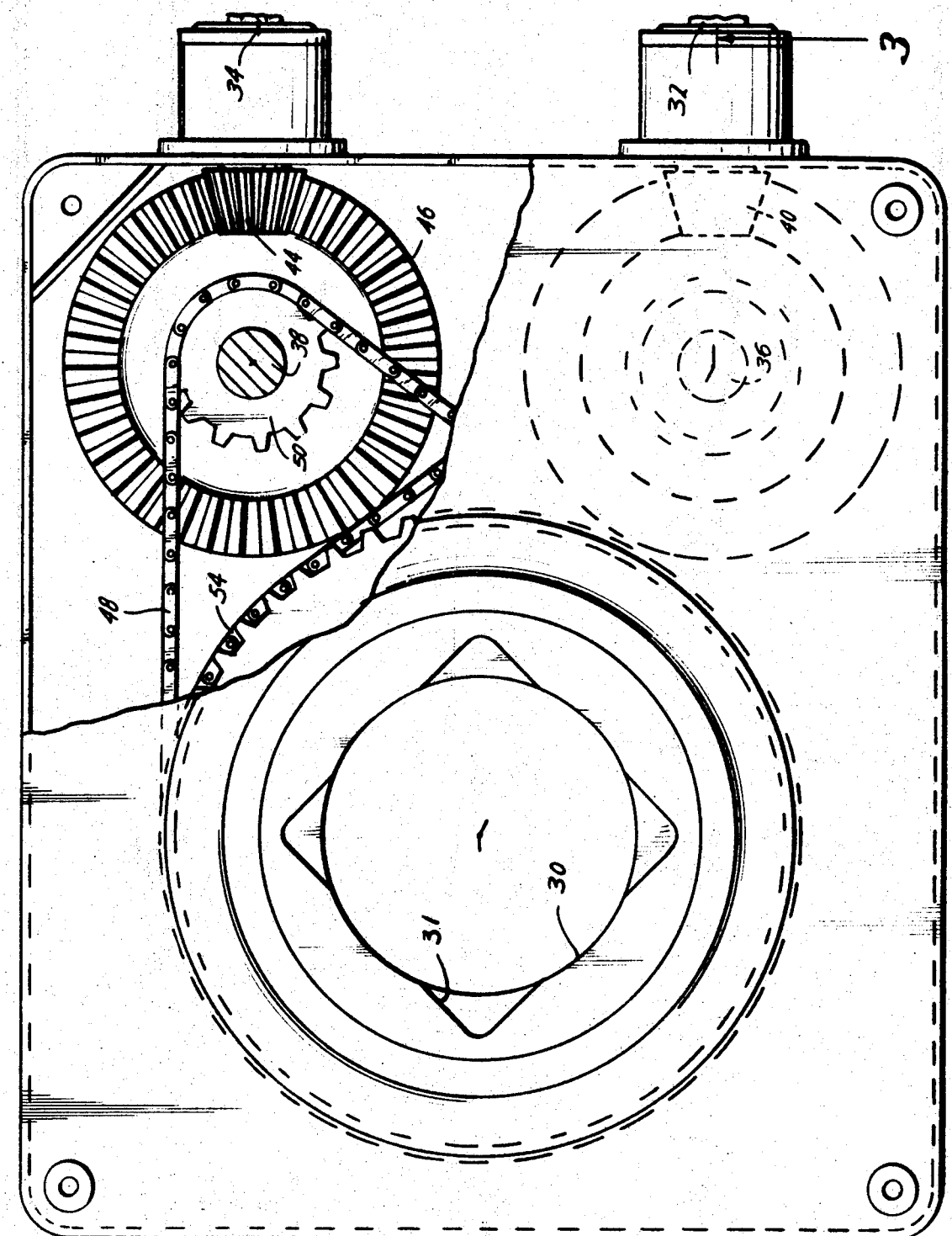

ROTARY TABLE POWER UNIT

BACKGROUND OF THE INVENTION

In the past rotary tables have been utilized for such purposes as drilling holes such as caisson and foundation holes by attaching a rotary table to a drag line. However, the size of the holes being drilled have been limited due to the size of the engine that could be mounted on the support without interfering with the action of the boom.

SUMMARY

The present invention is directed to providing a rotary table power unit utilizing two prime movers mounted side by side and connected to a dual input to the rotary table to provide a unit that will provide increased power for driving the rotary table and which is sized to be mounted under the boom of a crane. Furthermore, only a single prime mover need be used when one is sufficient and thus provide a more efficient unit.

DESCRIPTION OF THE DRAWINGS

FIG. 1 is a fragmentary perspective elevational view of the apparatus of the present invention in use on a crane;

FIG. 2 is an enlarged elevational view, partly in cross section of the rotary table portion of the present invention; and FIG. 3 is a cross-sectional view taken along the line 3–3 of FIG. 2 but omitting the chain drives.

DESCRIPTION OF THE PREFERRED EMBODIMENT

Referring now to the drawings and particularly to FIG. 1, the rotary table power unit of the present invention is generally indicated by the numeral 10 and while it has other uses, it will be described by way of example only in connection with the use of a crane or drag line 12 having a boom 14 to which the power unit 10 is attached for rotating a kelly joint 16 such as for the purpose of drilling holes.

The power unit 10 may include a support 18 which may be connected to the crane 12 below boom 14 such as from a pivot connection 20 and from one or more lines 22 supported from the boom 14.

Mounted on the support 18 are a pair of prime movers 24 and 26, preferably diesel engines, which are mounted side by side thus accommodating a larger amount of power that would be normally possible with a single large unit whose size would be limited so as not to interfere with the operation of the boom 14, and in addition provide flexibility in power by requiring only the use of a single prime mover on some task such as drilling small holes thus providing a more efficient power unit.

Referring now to FIGS. 2 and 3, the power unit 10 includes a turntable assembly 28 which includes a rotary turntable 30, dual power input shafts 32 and 34, each of which is connected to one of the prime movers 24 and 26 which have suitable clutch means for providing the power input to the rotary table 30. Each of the power input shafts 32 and 34, respectively. Thus, bevel gear 40 is attached to the power input shaft 32 and meshes with a bevel ring gear 42 which is connected to power shaft 36. Similarly, gear 44 which is connected to input shaft 34 meshes with and drives gear 46 which is connected to and rotates power shaft 38. In addition, a second speed reduction drive is provided between each of the power shafts 36 and 38 and the rotary table 30. Thus, a chain 48 is connected between an input sprocket 50 connected to shaft 38 and an output sprocket 52 around the exterior of the rotary table 30. Similarly, a second chain 54 is connected to input sprocket 56 which is connected to power shaft 36 and is also connected about an output sprocket 58 which is also connected about exterior of the rotary table 30. The chain drive speed reduction units are advantageous in that they are less expensive than other gear reduction types.

The rotary table 30 as is conventional includes a square interior 31 to drive a conventional kelly 16 which is supported and longitudinally moved from the boom 14 and is rotated as the turntable 30 is rotated to provide the rotation drive for drilling a hole with a conventional drill (not shown) connected to the bottom of kelly 16.

It is thus apparent that either or both of the prime movers 24 and 26 may be utilized through the dual power input shafts 32 and 34 to rotate the power shafts 36 and 38 and thus the turntable 30 when the power needs of the unit require both prime movers. But, of course, only a single prime mover need be utilized if its power is sufficient to handle the output power required by the turntable 30.

The present invention, therefore, is well adapted to carry out the objects and attain the ends and advantages mentioned as well as others inherent therein.

I claim:
1. A drilling crane comprising:
   an elongate boom supported therefrom at an angle from vertical;
   a support pivotally connected to the crane and positioned beneath the boom but above the ground;
   a pair of prime movers positioned side by side on the support and beneath the boom;
   a rotary table having first and second power inputs and positioned on the support, the first power input being connected to one of the prime movers and the second input being connected to the other prime mover;
   first and second power shafts positioned parallel to the axis of the rotary table;
   a first speed reduction drive between each of the power shafts and one of the power inputs;
   a second speed reduction drive between each of the power shafts and the rotary table; and
   drilling means supported from the end of the boom and rotated by the rotary table.
2. The apparatus of claim 1 wherein the second speed reduction drive means between each of the power shafts and the rotary table are chain drives, one of the chain drives being vertically offset from the other chain drive.